United States Patent [19]

Nutter et al.

[11] 4,112,487

[45] Sep. 5, 1978

[54] APPARATUS FOR WRITING DATA IN UNIQUE ORDER INTO AND RETRIEVING SAME FROM MEMORY

[75] Inventors: Geoffrey Nutter, Heald Green; William McGibbon, Levenshulme, both of England

[73] Assignee: Ferranti Limited, Hollinwood, England

[21] Appl. No.: 742,230

[22] Filed: Nov. 16, 1976

[30] Foreign Application Priority Data

Nov. 21, 1975 [GB] United Kingdom ............ 47988/75

[51] Int. Cl.² .............................................. G06F 7/04
[52] U.S. Cl. .................................................. 364/200
[58] Field of Search ... 364/200 MS File, 900 MS File

[56] References Cited

U.S. PATENT DOCUMENTS 3,270,324  8/1966  Meade et al. ...................... 364/200
3,535,694  10/1970  Anacker et al. .................... 364/200

*Primary Examiner*—Harvey E. Springborn
*Attorney, Agent, or Firm*—Cameron, Kerkam, Sutton, Stowell & Stowell

[57] ABSTRACT

Data processing apparatus includes a storage circuit or memory, and an addressing circuit for identifying word locations within the storage circuit into and from which a plurality of information items are to be written and read, respectively. Further, there is included an encoding circuit for encoding at least a part of each information item in one-out-of-n code, illustratively. In turn, the encoded part is successively shifted by a shift circuit so that it is stored in the storage circuit in a manner that the stored information in each word location has a bit order different from that order of any other information item as stored in the storage circuit. A translating or de-skewing circuit is provided for shifting the encoded data items as read out from the storage circuit in a direction opposite to that imparted by the first noted shift circuit.

1 Claim, 14 Drawing Figures

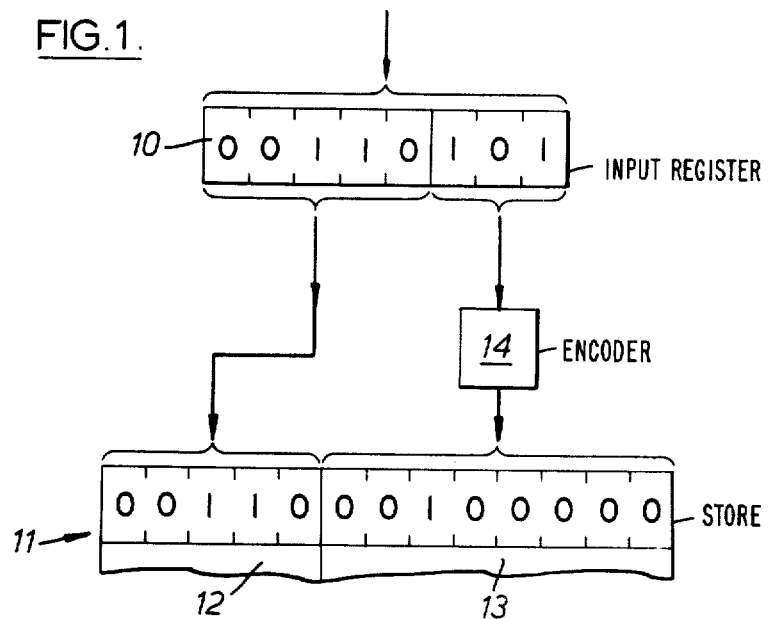

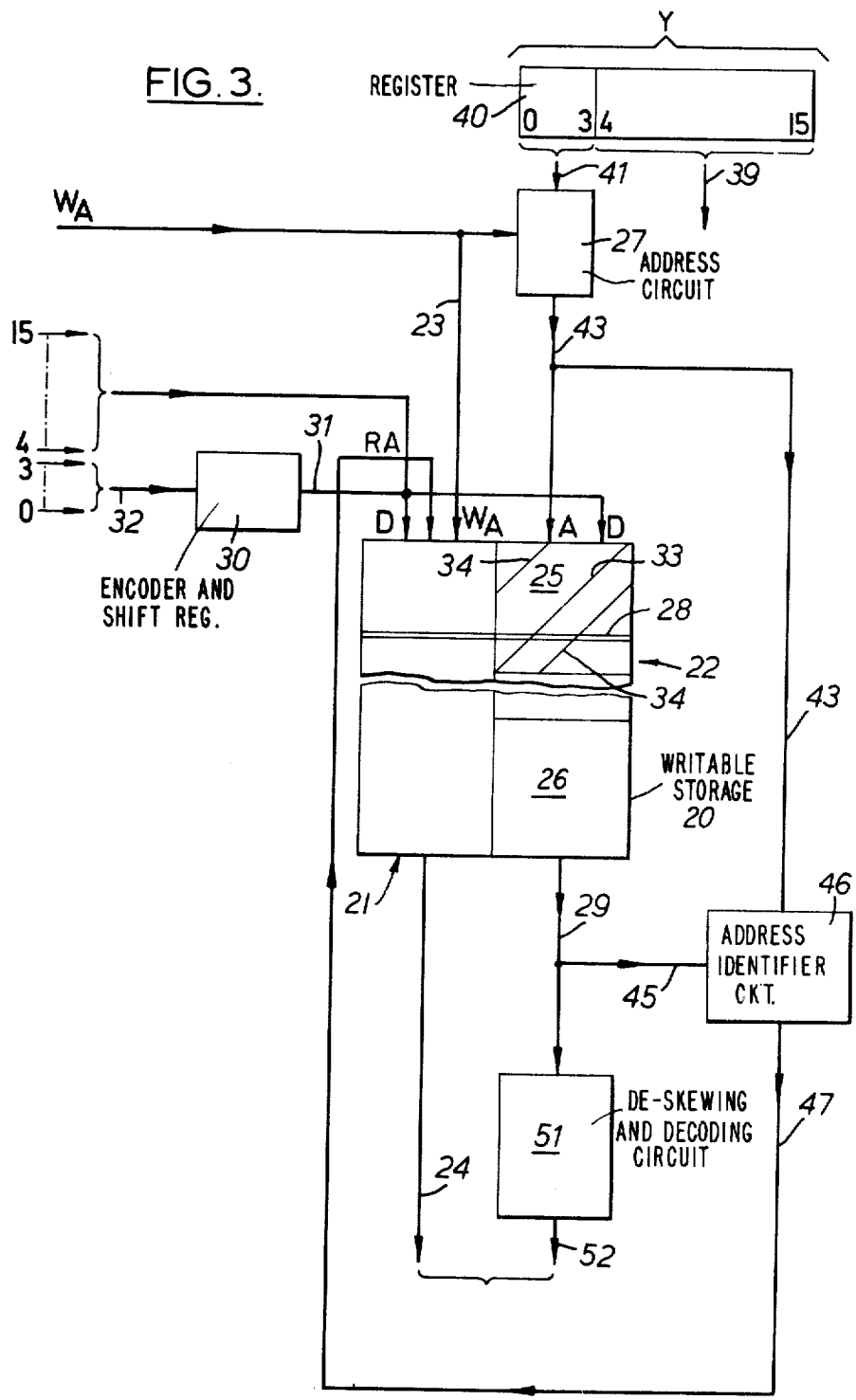

| $T_1$ | $T_0$ | $D_1$ | $D_0$ | O/P | | |
|---|---|---|---|---|---|---|
| 0 | 0 | 0 | 0 | 0 | 0 | 0 |
| 0 | 0 | 0 | 1 | 0 | 1 | 1 |
| 0 | 0 | 1 | 0 | 1 | 0 | 2 |
| 0 | 0 | 1 | 1 | 1 | 1 | 3 |
| 0 | 1 | 0 | 0 | 0 | 1 | 1 |
| 0 | 1 | 0 | 1 | 1 | 0 | 2 |
| 0 | 1 | 1 | 0 | 1 | 1 | 3 |
| 0 | 1 | 1 | 1 | 0 | 0 | 0 |
| 1 | 0 | 0 | 0 | 1 | 0 | 2 |
| 1 | 0 | 0 | 1 | 1 | 1 | 3 |
| 1 | 0 | 1 | 0 | 0 | 0 | 0 |
| 1 | 0 | 1 | 1 | 0 | 1 | 1 |
| 1 | 1 | 0 | 0 | 1 | 1 | 3 |
| 1 | 1 | 0 | 1 | 0 | 0 | 0 |
| 1 | 1 | 1 | 0 | 0 | 1 | 1 |
| 1 | 1 | 1 | 1 | 1 | 0 | 2 |

| 0000,0010 | | | | | | |
|---|---|---|---|---|---|---|
| B8 | 1010 | = | T10 | B0 | 0010 | = | T2 |
| B9 | 1011 | = | T11 | B1 | 0011 | = | T3 |
| B10 | 1000 | = | T8 | B2 | 0000 | = | T0 |
| B11 | 1001 | = | T9 | B3 | 0001 | = | T1 |
| B12 | 1110 | = | T14 | B4 | 0110 | = | T6 |
| B13 | 1111 | = | T15 | B5 | 0111 | = | T7 |
| B14 | 1100 | = | T12 | B6 | 0100 | = | T4 |
| B15 | 1101 | = | T13 | B7 | 0101 | = | T5 |

| $Y_0, Y_1$ / B0–B15 | 3 | 2 | 1 | 0 |
|---|---|---|---|---|
| 0, 4, 8, 12 | 1 | 2 | 3 | 0 |
| 1, 5, 9, 13 | 2 | 3 | 0 | 1 |
| 2, 6, 10, 14 | 3 | 0 | 1 | 2 |
| 3, 7, 11, 15 | 0 | 1 | 2 | 3 |

FIG. 10.
| B (0-3) -B(12-15) \ Y2, Y3 | 3 | 2 | 1 | 0 |
|---|---|---|---|---|
| B (0-3) | 1 | 2 | 3 | 0 |
| B (4-7) | 2 | 3 | 0 | 1 |
| B (8-11) | 3 | 0 | 1 | 2 |
| B (12-15) | 0 | 1 | 2 | 3 |
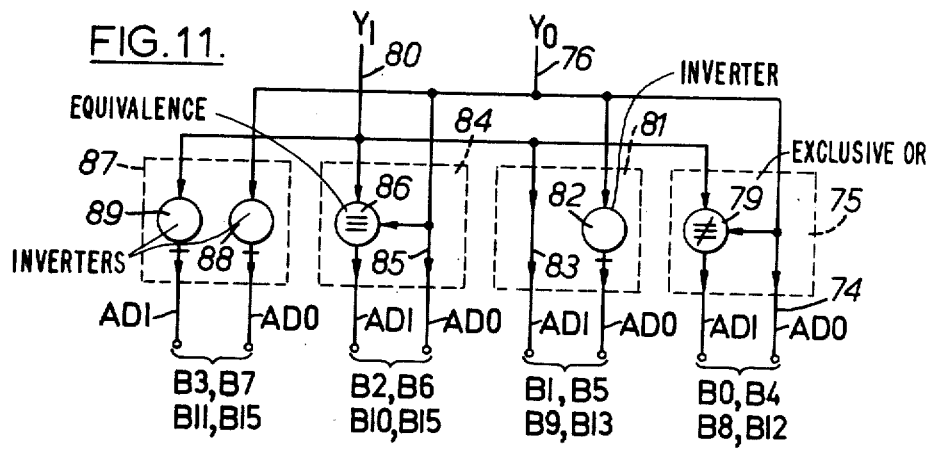
FIG. 11.
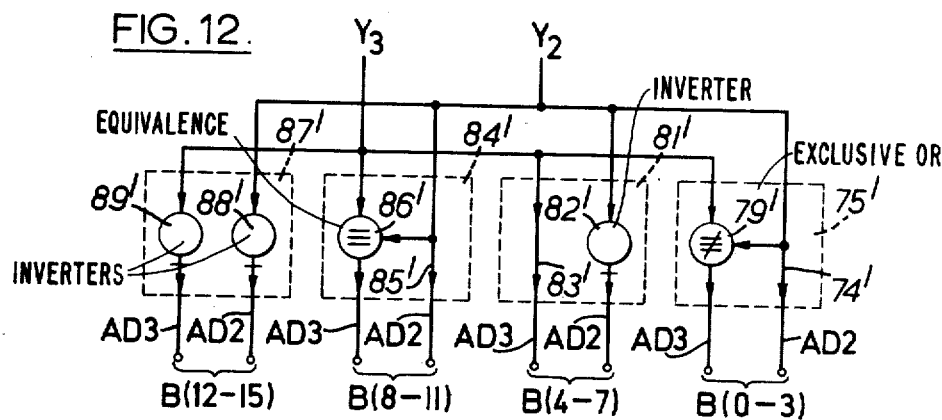
FIG. 12.

APPARATUS FOR WRITING DATA IN UNIQUE ORDER INTO AND RETRIEVING SAME FROM MEMORY

This invention relates to data processing and has application to the comparison of information items.

It is frequently necessary or desired to compare an item of information with other items to find one or more matches for all or part thereof. Where only two items of information are involved a simple comparison for example using a single arithmetic step in one machine cycle is most appropriate. However, where one or more information items are to be matched against a substantial number of items in a data store a process of sequential comparison is very time-consuming. To meet this situation associative stores, often called content-addressable memories, have been developed for identifying those stored items for which a match is found between predetermined portions thereof and an input item. Such stores are available in integrated circuit form but are expensive, and of small capacity especially compared with normal random-access writable storage. If, however, one uses normal random-access writable storage, a large number of machine cycles are required to check through the entire contents of the store for a match.

It is an object of the present invention to provide data processing apparatus in which the number of machine cycles required for comparisons involving a plurality of stored information items is reduced, without the need to use conventional associative stores.

According to one aspect of the invention, data processing apparatus includes a storage circuit or memory, and an addressing circuit for identifying word locations within the storage circuit into and from which a plurality of information items are to be written and read, respectively. Further, there is included an encoding circuit for encoding at least a part of each information item in a one-out-of-$n$ code, illustratively. In turn, the encoded part is successively shifted by a shift circuit so that it is stored in the storage circuit in a manner that the stored information item in each word location has a bit order different from that order of any other information item as stored in the storage circuit. A translating or de-skewing circuit is provided for shifting the encoded data items as read out from the storage circuit in a direction opposite to that imparted by the first noted shift circuit. Further, there is included a comparing circuit responsive to an information word to be compared for determining the digit significance for reading purposes to correspond with the significant digit of a similar one-out-of-$n$ coding of the information word to be compared.

Writable storage may be used for the one-out-of-$n$ coded portions but will differ at least in its addressing control from that for the remainder of each information item, but both are preferably made up of conventional random-access writable storage modules in integrated circuit form. Individual integrated circuits for the coded storage needs to be bit-addressable and is conveniently embodied as a plurality of one bit wide integrated circuits (bit column stores) whereas the remaining storage may be of integrated circuits that are word organized, e.g. in modules four or more bits wide.

Preferably, the unique digit orders are based, directly or indirectly, on unidirectional end-around shifting of all or parts of successive $n$ digit words by one digit position relative to the previous word so that, on a square matrix, digit positions of the same significance for successive rows or parts of rows are relatively skewed to appear on diagonals of that square matrix.

This skewing may be done separately for different square submatrix portions of an overll $n \times n$ matrix for the coded store portion, and these portions can themselves be subjected bodily to position codes that may, with advantage, be based on the same unidirectional end-around shifting transformation.

Each diagonal, or set of diagonals where part arrays or matrix portions of the overall matrix are concerned, will have a different digit significance that is the same for all $n$ information items. Addressing of the store has thus to be arranged to extract bits on such a diagonal or set of diagonals and the presence of a predetermined bit value will represent a matching item. For convenience, the term "skewing" as used herein is intended to extend to superposed group rotation of the bits of coded words already subjected to differential rotations.

For skewed bit addressing on a comparison read-out, a part or field of the word to be compared may be separately transformed as many times as necessary to give, for that field, equivalently significant fields of address words to be applied to the bit column stores so as to correctly bit-address those column stores. One part or field will identify a bit within each submatrix bit portion where there is a superposed bit portion rotation and another portion or field of different significance will be analogously treated to give another address field that identifies the submatrix concerned in each bit column store. The number of separate transformations required for the former field will be equal to the number of bit columns in a submatrix bit portion and the number required for the latter fields will be equal to the number of submatrix bit portions represented in each bit column store. Preferably, $4 \times 4$ bit submatrix portions of $16 \times 16$ bit store blocks are used so that a four bit address has its two lowest significant bits transformed to identify bits within bit portions and the other two bits transformed to identify the bit portion concerned.

Where more than $n$ information items are involved, and thus a corresponding number of addressable word locations are required, the storage circuit or memory to which the invention is to be applied may, in effect, be operatively split into two or more $n$-word store blocks preferably operable relative to the same input word for comparison purposes. Where the plurality of word blocks share the same integrated circuits, skewed bit addressing of the store blocks may be done sequentially with more significant bits applied directly (i.e., untransformed) to select a store block. Simultaneous comparisons are possible where more than one bit column storage unit, e.g. integrated circuit, is required in each bit column store and their outputs are not compared. Potentially, of course, such simultaneous operation is possible for different input words for each such store device if sufficient register space is provided and the relevant comparison word is inserted in a register assigned to a corresponding bit column store device.

Coding one-out-of-$n$ and storing a unique digit order allows a single significant bit value to represent, when read out, that there is a match between the corresponding information item or portion thereof and an input information word to be compared.

Where a portion only of an information item is so coded the significant bit value will indicate each item for which that portion matches. That portion may be a flag or classification section for a plurality of items of the same or a similar case, e.g. integers or any other class of data, or other particular properties or parameters such as color, size, age etc., present in a file of data relating to people, objects, places or combinations thereof.

Alternatively, that portion may be simply a fragment or field of an information item of which the remainder or at least other fields are to be compared with corresponding further portions of the information word to be compared. Even if several matches are found for the coded portions of information items, and subsequent comparison is in separate machine cycles, a complete comparison operation will take far fewer cycles than required for full sequential comparisons. Furthermore, normal writable storage circuit only is required together with appropriate addressing logic and that is cheaper and/or more flexible in application than conventional content addressed store modules.

In its broadest aspect the invention envisages using space and/or digit position significant codes other than one-out-of-$n$. In this context space means that most of the digit positions allocated to the code are, for any particular code value, all of the same value. One-out-of-$n$ is, of course, an extreme case of such codes. If other codings are used that put significant bit values in more than one digit position further logic circuitry will usually be required to identify one or more stored items to be further investigated in subsequent machine cycles. It may also be that more than one skewed store access is made, for example one for each significant bit position and logic circuitry used to process the results of such a plurality of skewed accesses.

Specific implementation of the invention will now be described, by way of example, with reference to the accompanying drawings in which:

FIG. 1 is a schematic block diagram illustrating the principle of the invention;

FIG. 2 is a diagram showing the organization of the store of FIG. 1;

FIG. 3 is a block diagram of a preferred embodiment of a system embodying the invention;

Figures 4, 5:
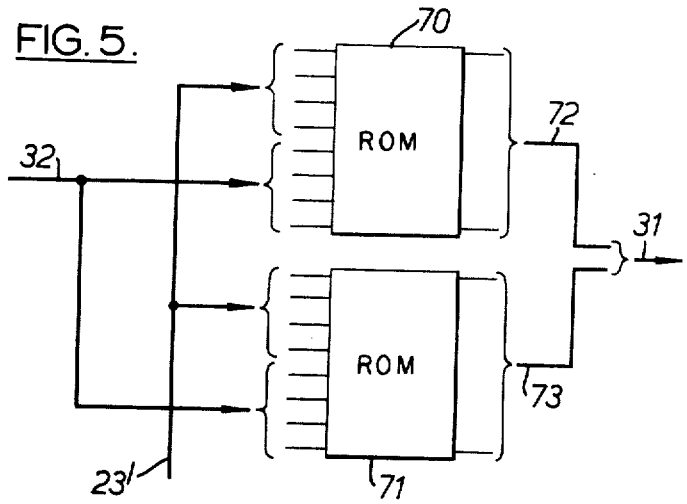
FIG. 4 is a diagram showing a preferred organization of a store block of FIG. 3.
FIG. 5 is a block circuit diagram of a store block loading facility.
Figures 6A, 6B:
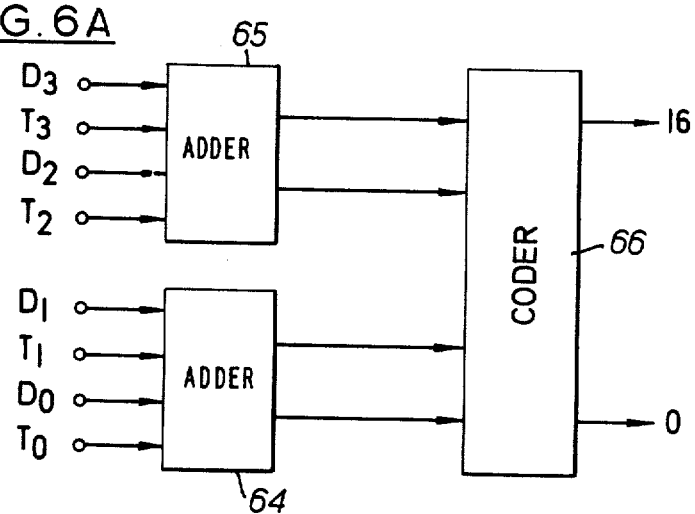
Figures 7, 8, 9:
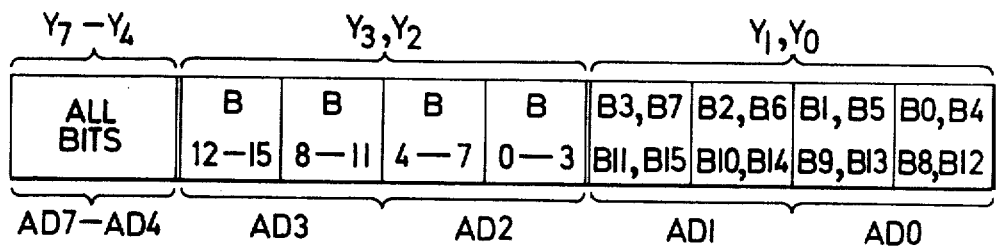
Figure 13:
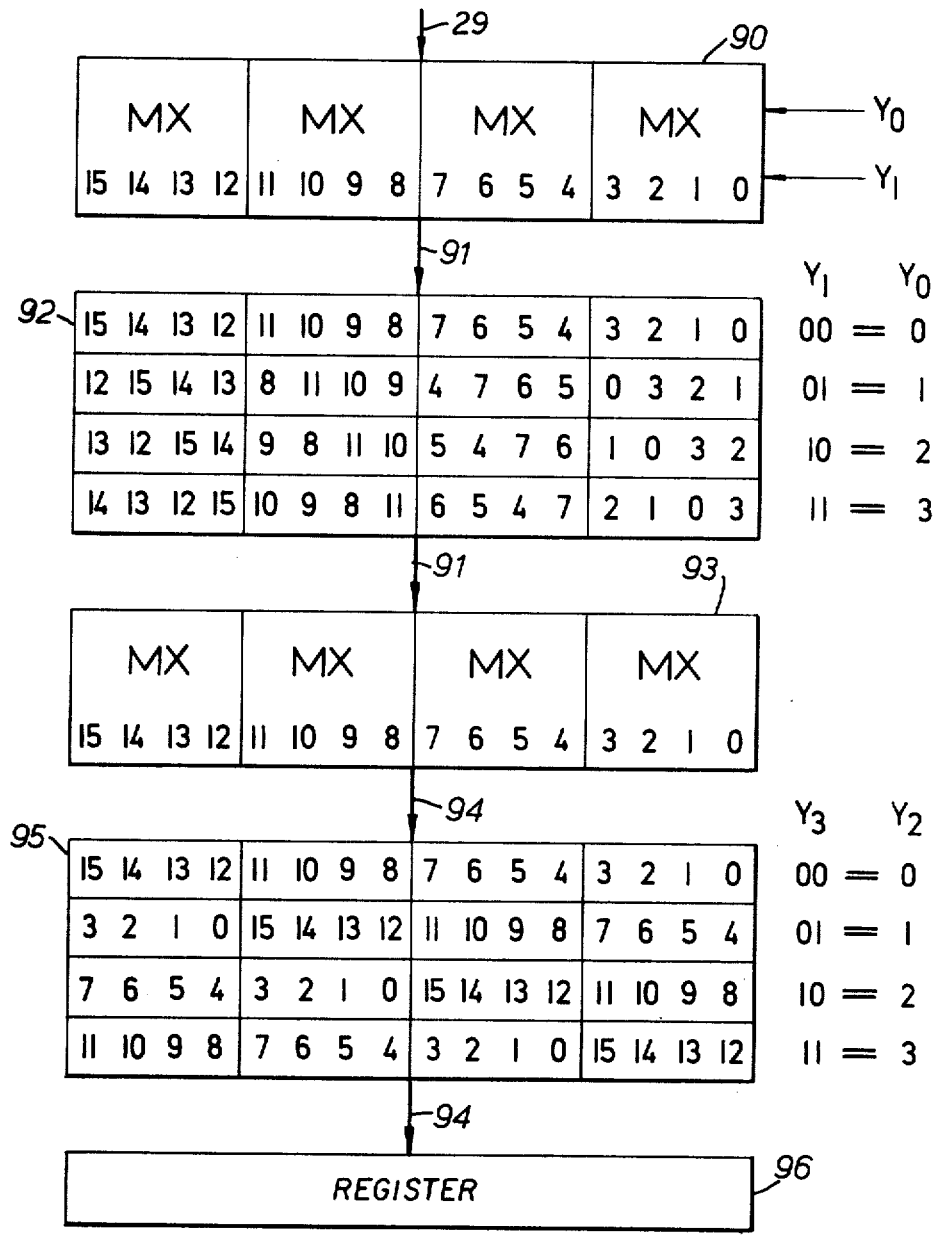

FIGS. 6A and B are a block circuit diagram of an alternative store block loading facility together, and a truth table for the logic employed, respectively;

FIG. 7 is a diagram showing how an eight-bit address word can be used to skew access a store block;

FIG. 8 is an example of the operation of the address word of FIG. 7 for bit significance 2 in FIG. 4;

FIG. 9 is a truth table for address transformations appropriate to addressing bit portions of a stored block;

FIG. 10 is a truth table for address transformations appropriate to identifying a bit portion of a stored block;

FIG. 11 and 12 are logic circuit diagrams of a skew addressing facility in accordance with FIGS. 8, 9, and 10; and FIG. 13 is a block circuit diagram of an output facility combined with transformation truth tables therefor.

FIGS. 1 and 2 illustrate the principle of operation of the invention. This is shown on a small scale for simplicity, and considers a situation where input data is presented in 8-bit words with the three least significant bits of all words always defining a feature or features of the information carried by the remaining five bits. The input data word will be applied to an 8-bit input register 10 for subsequent application to a store 11. The store 11 consists of two parts. One of these parts 12 is a normal store arranged to hold the 5 most significant bits of the input data word. The other part 13 of the store 11 is eight bits wide. The three least significant bits from register 10 are passed through an encoder 14 arranged to encode its input as a one-out-of-eight output which is applied to the store part 13. Only the first word of storage of store 11 is shown.

FIG. 1 also illustrates the operation of the arrangement just described. Considering the 8-bit number shown in the register 10, bits 3 to 7 are passed directly to store part 12. Bits 0 to 2, representing in binary form the decimal number 5, are encoded such that the resulting output to store part 13 puts a '1' only in the position of bit 5 in that store parts, all other bits being '0'.

FIG. 2 shows the organization of the storage capacity of store part 13. By using a suitable addressing circuit, each successive word, consisting of the one-out-of-eight encoded output of encoder 14, is shifted one bit to the left relative to the preceeding word. Hence, as shown, all the least significant bits, that is bit 0, will occupy the major diagonal of the store. Other selected bits, say bit 5, may be found on two minor diagonals of the store.

If a search to be carried out requires the retrieval of all information in those data words whose three least significant bits have a decimal value of 5, then it is necessary to look at bit 5 of each of the eight stored words. If these were stored without the one-bit shift between successive words it would be necessary to search each word in turn. However, as shown in FIG. 2, all the bit 5's may be read out in a single operation by addressing a different bit of each word. For example it will be necessary to address bit 5 of word 1, bit 6 of word 2, bit 7 of word 3, bit 0 of word 4, and so on. The use of this combined coding and shifting technique greatly simplifies this type of searching.

The example given above is a simplification of actual requirements. A search store of this type, as respresented by store part 13 in FIG. 1, would probably be more than 8 bits wide. In addition, the addressing is in practice rather complex since it has to allow for the checking of any desired bit in each word. In order to simplify the addressing, the store part 13 may be divided into smaller sub-divisions.

FIGS. 3 and 4 are concerned with a storage arrangement for use with a 16 bit data word, of which the four least significant bits are coded by a one-out-of-16 encoder. To simplify the addressing, the 16 by 16 bit store array is subdivided into 4 by 4 bit sub-arrays.

FIG. 3 shows writable storage 20, which comprises the memory of this invention and is word organized and comprises two parts 21 and 22 of which the part 21 is conventionally arranged and controlled to be addressable over lines 23 to produce on output lines 24 a multibit word output from the addressed location. For convenience, the store part 21 will be assumed to be 12 bits wide and to comprise 256 words, though it should be understood that the store may be designed for more or less words that can be shorter or longer in bit length. The store part 22 is indicated as being at least notionally broken into blocks 25 and 26 of writable storage that is both bit and word addressable by address circuit 27, preferably being formed as separate 256 × 1 bit column stores. In general, the store blocks 25 and 26 will, together, have a plurality of word organized locations corresponding one-to-one and word addressable with the word locations of the store part 21, and each will comprise a plurality of bits capable of expressing a portion of an information item in one-out-of-$n$ code. In the particular example mentioned above, the blocks 25 and 26 are 16 bits wide and so are capable of expressing four digits of true binary code in one-out-of-16 code, i.e. a unique bit position for each four-bit numerical value. The four-bit portion will be part, for example the least significant bits, of a 16-bit information item of which the remaining 12 bits are stored in the corresponding location of store part 21. The word addressing aspect of address circuit 27 is conventional and will not be discussed further, attention being directed to the bit addressing aspect.

An exemplary store location is indicated at 28 where bits 0 to 15 of storage block 25 represent a one-out-of-16 coding of the least significant four bits (0 to 3) of a 16-bit information item of which the remaining bits (4 to 15) are stored at a corresponding location in the store 21.

The storage blocks 25 and 26 have several modes of operation. They can be read on a word organized basis simultaneously with reading the corresponding location in store part 21, and lines 29 are shown as common outputs therefrom for the one-out-of-$n$ coded word; addressing may be via lines 23 in common with reading of the store part 21. Writing to the store blocks is also conveniently on a word basis and simultaneous with writing to the store part 21, addressing again being, for convenience, assumed to be over the same lines 23. The word to be written will be provided by a circuit block encoder and shift register 30 operative to code part of each input information item on lines 32 and to impose a unique digit order in its outputs 31. The elements of the block 30 are well-known in the art as illustrated by the one out of 16 decoder as manufactured by Signetics Corporation under their designation N74154 and described at page 2-144 of the *Signetics Data Book*, 1974. For simple diagonal skewing the encoder 30 may comprise a binary to one-out-of-$n$ encoder that receives the least significant four bits of the information item concerned over lines 32, and a re-entrant shift register that receives the code outputs and supplies the store blocks 25 to 26 via lines 31.

Such a shift register serves to skew the bit significance of the code word so that bits of the same significance appear progressively shifted by one digit position on a matrix representing bit storage elements of a store block 25, 26.

The store blocks 25 to 26 are also required to be operative for read-out on a diagonal basis and so need to be bitaddressable column by column and simultaneously. This requirement arises from the way in which comparisons are to be done between desired bits of a word Y and the contents of one of the blocks 25 to 26. A register 40 is shown for the word Y. The least significant stages feed, via lines 41, the address circuit 27 that is effective to generate appropriate diagonal element enabling signals over lines 43.

In FIG. 3 the blocks 25 and 26 are shown as sharing output lines 29 even in their diagonal read-out mode of operation as will be required where each column is an integrated circuit device. Then considering only one block, say 25, any line having the one-out-of-$n$ coded bit value will represent a match between the least significant bits of the word Y and the corresponding word location in the block 25 and store part 21. The store block outputs 29 are shown applied via branch lines 45 to an address identifier circuit 46 which comprises the comparing means of this invention and whose outputs 47 will represent the corresponding store address or location in the store block 25 and thus in the store part 21. That store location will contain the remainder of the matching information item which can then be addressed and read out onto lines 24 for further processing, for example, comparison with the most significant contents of the register 40 on lines 39.

In practice the address identifier circuit 46 will effectively gate through the address actually applied to the relevant bit column store of the blocks 25 to 28. Lines 43 are thus shown applied to the circuit 46 though the latter may, in reality, be part of the circuit 27 equivalent to gating on branches from the lines 43.

Sharing of the output lines 29 by the store blocks 25 to 26 implies that those blocks will be operated in separate, illustratively consecutive, machine cycles. The store block outputs 29 are also shown applied to a translating means including a de-skewing and decoding circuit 51 for translating the skewed output into true binary code on lines 52, this circuit 51 being required on normal word addressing of the overall store configuration 26 to obtain a conventional 16-bit binary word.

Only where the store blocks 25 to 26 comprise or extend over bit column integrated circuits can they, or groups of them, have separate output lines and so be simultaneously addressed over lines 43.

Then separate address indentifier circuits 46 will need to be provided for the outputs of each store block or group thereof, and the most significant bits of the store address will be set according to which identifier circuit detects a match.

The presence of a match in a store block skewed read will be indicated when the input of identifier circuit 46 is not all-zero, assuming, that is, that binary "1" represents the significant bit value of the address circuit 27. A match would, of course, also be indicated by a non-zero output of the circuit 46. However, it is convenient to detect a match using the input lines 45, especially where provision is to be made for coping with multiple matches i.e., where more than one of the lines 45 carries a binary "1" signal. For a system as described so far the circuit 46 will need to be operated separately for each binary "1" received and that will require logic in the lines 45 for detecting binary "1"s and controlling their application to the coder 46.

FIG. 4 shows a preferred ordering of the original digit significances as stored in one of the store blocks 25 or 26. This is based also on end-around shifts but now applied to the outputs of one-out-of-$n$ coder 30. Again a 16-bit code word is assumed so that the store block shown is a 16 × 16 bit array. The sub-array portions treated separately are 4 × 4-bits so that there are sixteen such portions for each store block array. Also the separately shifted portions are themselves bodily shifted end-around relative to their positions in rows of a matrix array of those portions. In particular, the specific 4 × 4-bit portions are shown in FIG. 2 to have been subjected to bodily shifts that exactly parallel those for each individual portion which itself exactly parallel the successive unidirectional end-around shifts of one bit position at a time. As will be described later this arrangement allows a particularly advantageous form of bit addressing control.

The sixteen word locations are labelled T0 to T15 for rows and the conventional bit significances are labelled B0 to B15 for columns, so that individual bit locations are coordinate identified e.g. T0, B0, for the top right bit. The 4 × 4-bit portions have coordinates T0 - T3, T4 - T7, T8 - T11, T12 - T15 for rows and B0 - B3, B4 - B7, B8 - B11, B12 - B15 for columns. Now, for example, the top right sub-array portion has coordinates T0 - T3, B0 - B3. In the first row of sub-array portions T0 - T3 the bit significances of the original coded word appear in their original order for location T0 and the four portions B0 - B3, B4 - B7, B8 - B11, B12 - B15 relate to the bit significances 0 - 3, 4 - 7, 8 - 11 and 12 - 15 respectively. Then, in each sub-array portion separately, successive end-around shifts are shown for locations T1, T2 and T3 so that the lowest bit significances of each portions namely, 0, 4, 8 and 12 occupy the main diagonals of the four positions and each other bit significance occupies complementary minor diagonals. For this first row of sub-array portions all of the original bit significances are shown so that the identity of the operations for each portion is evident.

For the second row of sub-array portions T4 - T7 the original bit significances 0 - 3, 4 - 7, 8 - 11, 12 - 15 now occupy sub-array portions B4 - B7, B8 - B11, B12 - B15, and B0 - B3, respectively i.e., a bodily end-around shift comparable to that from location T0 to location T1 within each of the first row of sub-array positions. As can be seen fully for portion T4 - T7, B4 - B7, relating to original bit significances 0 - 3, and skeletally for the other portions, each sub-array portion undergoes the same shifts from locating T4 to T7 as it does from location T0 to T3.

Further bodily rotational shifts of the portions are shown skeletally in the lower half of the FIG. 2 relative to the third and fourth rows of sub-array portions T8 - T11 and T12 - T15.

It is noted that for each sub-array portion individually the relation of stored to original bit significances is represented by major and minor diagonals and that a further similar relation is superposed in shifting the portions bodily. As can be seen, the original bit significances 0 to 3 and the major diagonals (4, 8 and 12) of the other portions make overall diagonals as described for FIG. 1, but the other bit significances are altered by the superposition. Despite this superposition, the resulting ordering of the original bit significances is referred to herein as "diagonally related". Other forms of skewing or reordering may achieve an equally satisfactory result in terms of economy of the bit addressing logic.

FIG. 5 shows a suitable loading arrangement instead of the coder and re-entrant shift register designation previously ascribed, illustratively, to block 30 of FIG. 3. Use is made of read-only memories that are readily available commercially. For 16 bit locations of the store blocks, two 256 × 8 bit read-only memories 70 and 71 are used, each addressed over eight lines 32 presenting in binary code the store block address bits on four lines and the four least significant digits of the information item to be stored. This addressing is accordingly shown as from the least significant lines 23' of addressing cable 23, and the lines 32 of FIG. 3. Each read-only memory 70, 71 has sufficient locations to accommodate all possible permutations of the addressing lines and provides an eight bit output on lines 72, 73 and these constitute different halves of the store block input lines 31.

An alternative loading facility is shown in FIG. 6A together with a truth table in FIG. 6B. FIG. 6A shows two two-digit adders 64 and 65 but each with only two outputs for the least significant digits. The inputs of adder 64 are shown to be the two least significant bits T0, T1 of the relevant store block address and the two least significant bits D0, D1 of the data to be written to store. A truth table is shown in FIG. 6B for the action of the adder 64 on the inputs D0, D1, T0, T1, and next to the output column there are normal decimal representations as used in FIG. 4. From those representations it should be clear that the adder 64 performs the skewing for each of the 4 × 4 bit portions, the representations in fact corresponding to the first square T0 - T3, B0 B3 of FIG. 4, i.e., with no offset.

The adder 65 is operative relative to its inputs D2, D3, and T2, T3 in the same way as adder 64, and its outputs constitute the next two significant digits of a four-bit word that is shown applied to a binary to one-out-of-16 coder 66. The coder outputs are also indicated in significance from the bottom upwards as feeds for the store block columns but these outputs in fact carry the skew ordered digits. The action of the adder 65 obeys a truth table similar to that shown for adder 64 and its outputs specify particular sub-array portions of FIG. 2 with the required skewing, i.e. impulse desired offsets to the outputs of adder 64.

As mentioned above, the bit columns B0 to B15 may comprise separate integrated circuit random access stores that are one bit wide and such stores will be more than 16 bits long, typically they may be 256 bits long and 16 such stores will thus accommodate 16 of the store blocks 25 of FIG. 4. An eight-bit address used for bit selection will thus have its four most significant address bits used to identify a run of 16 bits corresponding to a particular store block. The remaining four address bits are used to identify one bit in each of the sixteen column stores within that particular 16-bit run and the bits so identified will be those of a desired original bit significance. A four-bit word or word part designating the desired original bit significance therefore has to be translated to give the appropriate four least significant address bits for each bit column store. In effect, two bits identify the run of four bits corresponding to a particular sub-array portion, and two bits identify one bit within that run of four. Because of the particular superposed ordering pattern shown in FIG. 4, this can be achieved using identical translation logic for the two least significant bits and the next two bits.

FIG. 7 illustrates the basic translations to be performed to achieve the required skewing for each store block directly from the contents of the register 40 of FIG. 3. The partitioned box is intended to show how, for the eight digits 0 to 7 of a binary word Y representing the original bit significance, the values of the least and next least significant pairs of digits are translated relative to the bit columns B0 to B15 and 4 × 4 digit sub-array portions P (0 - 3), P (4 - 7), P (8 - 11) and P (12 - 15) of a store block to form equivalently significant pairs of bits 0, 1 and 2, 3 of the address word D for the bit column stores.

The four right-most compartments relating to translation of the least significant pair of bits $Y_0$, $Y_1$ to AD0, AD1, reflect the fact that the internal skewing of each 4 × 4 bit sub-array portion P is the same and that bit column groups B0 - B3, B4 - B7, B8 - B11 and B12 - B15 can be similarly treated, the middle four compartments serving to select the appropriate 4 × 4 bit sub-array portion P for each column group.

As an example of the translations represented by FIG. 7, the bit column store addresses for an original bit significance of value two (i.e., 0000,0010) are shown in FIG. 8 for one store block i.e., considering only the four least significant digits (0010). The identity with FIG. 4 where the locations of original bit significance 2 are shown fully is clear. Hence, considering FIG. 4, the bit having original significance 2 is to be found in word T2 for bit column store B0, word T3 for bit store B1, word T0 for bit store B2 and word T0 for bit store B3. Similarly, the required bit is to be found in word T6 for bit store B4, word T6 for bit store B5, word T4 for bit store B6, and word T5 for bit store B7.

A further insight into the translation within each 4 × 4 bit sub-array portion may be gained from FIG. 9 which shows a truth table useful for indicating the logic required to perform these translations. In particular, FIG. 9 shows columns relating to values of the least significant bit pair $Y_0 Y_1$ and rows relating to the translation for respective ones of the right-most compartments of FIG. 7. Again taking the original bit significance of two it is seen that address value 2 is required for columns B0, B4, B8 and B12; address value 3 is required for columns B1, B5, B9, and B13; address value 0 is required for columns B2, B6, B10 and B14; and address value 1 is required for columns B3, B7, B11 and B15.

All that is required to fully realise FIG. 9 is the appropriate offsets for each bit column group B0 - B3, B4 - B7, B8 - B11, and B12 - B15, namely 0, 1, 2 and 3, respectively, for the next pair of address digits AD2, AD3. The truth table for these digits is shown in FIG. 10 and is identical in value to that of FIG. 9, so that similar logic circuits will be satisfactory. Suitable logic circuits are shown in FIG. 11 specifically for a least significant bit pair.

The function of the compartment labelled B0, B4, B8, B12 in FIG. 7 is shown realised at 75 in FIG. 11 in accordance with the first rows of the FIG. 9 table by a direct connection 74 from $Y_0$ line 76 to AD0 lines for the bit column store concerned, and a connection to the corresponding AD1 lines from the output for a non-equivalent circuit 79, otherwise called an Exclusive-OR-circuit, fed from both $Y_1$ line 80 and the $Y_0$ line 76. The function of the compartment labelled B1, B5, B9, B13, in FIG. 7 is shown realised at 81 in FIG. 11 in accordance with the second row of the FIG. 9 table by a connection from $Y_0$ line 76 to the AD0 lines via an inverter 82, and a direct connection between $Y_1$ line 80 and the AD1 lines.

The function of the compartment labelled B2, B6, B10, B14 in FIG. 7 is shown realised at 84 in accordance with the third row of the FIG. 9 table by a direct connection 85 between $Y_0$ line 76 and the AD0 lines, for those bit column stores, and a connection to the corresponding AD1 line from an equivalence circuit 86 fed from both the $Y_0$ and $Y_1$ lines. The function for the compartment labelled B3, B7, B11, B15 in FIG. 7 is shown realised at 87 in accordance with the bottom row of the FIG. 9 table by inverters 88 and 89 in connections between $Y_0$ line 76 and the AD0 lines for those bit column stores and between $Y_1$ line 80 and the AD1 lines, respectively.

Logic like that of FIG. 11 can also be used to realise the required translations between bit pairs $Y_2$, $Y_3$ and AD2 and AD3. To do this $Y_0$, $Y_1$, AD0 and Ad1 lines would be made to correspond to $Y_2$, $Y_3$, AD2 and AD3 bits respectively, and the boxes 75, 81, 84 and 87 would perform the functions of the compartments labelled in FIG. 2 as B(0 - 3), B(4 - 7), B(8 - 11), and B(12 - 15), respectively. This is shown in FIG. 12 with primed references where appropriate.

The skewed bit addressing facility just described requires only sixteen address lines for each 16 × 16 store block and these are the lines AD0 and AD3 connected as indicated above for FIGs. 11 and 12. A further four lines will serve to identify any of 16 such store blocks so that twenty address lines will serve the preferred 256 × 1 bit column stores readily available in integrated circuit form. Clearly, other sizes of column store can be served using an appropriate number of address lines.

As mentioned above, on normal word addressing, the outputs of the bit column store need to be re-ordered so that they can be further processed or if necessary, readily reconverted to true binary form in a one-out-of-n to binary converter. This "de-skewing" can be readily achieved using two banks of multiplexers as shown in FIG. 13, where the store block output lines 29 are shown applied to a bank of four 4-bit four-way multiplexers 90 controlled by the two least significant bits $Y_0$ and $Y_1$ of the addressing word. The lower edge of the bank of multiplexers 90 has indications of the actual bit significances of its outputs 91 and these, of course, represent the desired final re-ordering of the contents of lines 29. The multiplexers 90 serve to deskew each group of four bits ocrresponding to B(0 - 3), B(4 - 7), B(8 - 11) and B(12 - 15) of FIG. 4 and bits 0 - 3, 4 - 7, 8 - 11 and 12 - 15 of the multiplexers 90. De-skewing is done within each of the multiplexers 90 but not between them. The required transformations are, in effect, rotations that reverse the rotations made in originally skewing the 4 × 4 bit sub-array portions during loading. These reverse rotations are indicated in partitioned box 92 shown interrupting the multiplexer output lines 91 and are identified with particular values of the controlling bits $Y_0$, $Y_1$, which are shown both in binary and in normal decimal form as used in FIG. 4. Comparison of this table with the 4 × 4 bit sub-array portions of FIG. 2 will show the correction achieved which, as would be expected, requires the same rotation in each row of the box or table 92, but different rotations for each row.

These output lines 91 are shown applied to a second bank of four 4-bit, four-wry multiplexers 93 that are controlled by the next two bits $Y_2$ and $Y_3$ of the addressing word. Again the lower edge of the box 93 shows the actual output significances of the multiplexers and, this time, these outputs 94 will carry the correct order of bits of the word read out. Partitioned box 95 in the ouputs 94 shows the transformations required to complete the re-ordering. This time the transformations are between, not within, the multiplexers 95 and serve to reverse the bodily rotations of the 4 × 4 bit sub-array portions of FIG. 4. For convenience the outputs 94 are shown feeding a one-out-of-16 register 96, the output of which may be connected to a one-out-of-$n$ to binary converter.

Embodiments of the invention can also be used for multiple association by having more than one bit of different and thus significant value in the store block word locations. This could be of particular utility in data processing relating to situations for which there are tolerances that do not correspond to binary powers.

What we claim is:

1. Data processing appartus for processing a plurality of information items, said data processing apparatus comprising:

a. a memory having an input and an output, and operable in a write mode for receiving and storing at least a portion of each of the plurality of information items into a plurality of corresponding multibit word locations and in a read mode, for reading out information items from said plurality of word location;

b. an addressing circuit for addressing selected word locations of said memory in both the write and read modes of operation;

c. loading means coupled to said input of said memory and including an encoder circuit for receiving and encoding said portion of each said plurality of information items, and a shift circuit for successively imparting to said encoded portion of each of said plurality of information items a shift of a predetermined number of bits in a predetermined direction, whereby said encoded portion of each of said plurality of information items is stored into a separate multi-bit word location as determined by said address circuit in a manner that one of said stored information items has a sequence of bits arranged in order different from that order of any other stored information item;

d. translating means coupled to said output of said memory for reading out simultaneously from said memory a single bit of each of said plurality of information items stored in said plurality of corresponding word locations and applying a shift of said predetermined number of bits to said single bits in a direction reversed to said predetermined direction; and e. comparator means coupled to said output of said memory for comparing one of said single bits with another selected bit from a different information item.

* * * * *